United States Patent [19]
Dornte

[11] 3,867,175
[45] *Feb. 18, 1975

[54] NON-FOGGING MATERIAL
[75] Inventor: Ralph William Dornte, Lower Southampton Township, Pa.
[73] Assignee: ESB Incorporated, Philadelphia, Pa.
[ * ] Notice: The portion of the term of this patent subsequent to Apr. 10, 1990, has been disclaimed.
[22] Filed: Sept. 28, 1972
[21] Appl. No.: 292,939

Related U.S. Application Data
[63] Continuation-in-part of Ser. Nos. 86,883, Nov. 4, 1970, Pat. No. 3,726,703, and Ser. No. 174,135, Sept. 30, 1971, Pat. No. 3,766,299.

[52] U.S. Cl............. 117/47 A, 106/13, 117/124 E, 117/138.8 A, 117/138.8 F, 117/138.8 UA, 117/161 P, 117/161 UT, 117/161 UN
[51] Int. Cl......................... C09k 3/18, C03c 17/32
[58] Field of Search....... 117/124 E, 47 A, 138.8 A, 117/138.8 F, 138.8 UA, 161 UN, 161 UT, 161 P; 106/13; 260/874, 836

[56] References Cited
UNITED STATES PATENTS
| | | | |
|---|---|---|---|
| 3,471,359 | 10/1969 | Goldstein | 161/227 |
| 3,507,814 | 4/1970 | Velzmann | 260/2 |
| 3,515,579 | 6/1970 | Shepherd et al. | 117/124 |
| 3,538,185 | 11/1970 | Davis et al. | 260/837 |
| 3,726,703 | 4/1973 | Dornte | 117/47 |

Primary Examiner—P. E. Willis, Jr.

[57] ABSTRACT

A non-fogging, abrasion resistant material is provided by applying a transparent, non-fogging coating to a normally fogging, transparent or reflecting substrate. The non-fogging, abrasion resistant coating comprises a highly cross-linked alkylene imine polymer. The polyalkylene imine may be further modified by an adhesion promoter through reaction with the amine hydrogens of the polyimine.

The non-fogging articles include goggles — safety and ski, bathroom mirrors, windows, boat windshields, packages, eye-glasses and gas masks.

13 Claims, 7 Drawing Figures

NON-FOGGING MATERIAL

CROSS REFERENCE TO RELATED APPLICATIONS

This application is a continuation-in-part directed to a particular coated substrate described in U.S. Pat. application Ser. No. 86,883, filed Nov. 4,1970, entiled "Non-fogging Material", which issued as U. S. Pat. No. 3,726,703 on Apr. 10, 1973, and a resinous composition described in Ser. No. 174,135, Filed Sept. 30, 1971 entitled "Reaction Product of Polyalkylene Imine and Epoxy, Halo, Ethylenic Substituted Difunctional Compounds", which issued as U. S. Pat. No. 3,766,299 on Oct. 16, 1973, both of which were filed by Ralph William Dornte.

BACKGROUND OF THE INVENTION

When a surface is at a temperature on or below the dew point of the prevailing atmosphere, water condenses on the surface in the form of small droplets. When the condensation is on transparent or reflecting surfaces it is referred to as "fogging". This problem of fogging is critical for some applications and at least troublesome for many others. Substrates of plastic, glass, and metal surfaces all fog without some modification. Many attempts have been made to reduce or eliminate the fogging problem particularly for automobile windshields and safety goggles. Early attempts included the application of films containing glycerol and more recently coatings based on hydroxy substituted acrylic polymers have been offered; see U. S. Pat. No. 3,488,215 to Shephered et al. Other coatings offered to reduce the fogging of surfaces include films containing surfactants and more recently U. S. Pat. No. 3,411,945 to Chao describes the incorporation of surfactants in the thermoplastic polymer substrate to reduce the tendency towards fogging of the surface.

Accordingly, it is an object of the present invention to provide a non-fogging surface that does not interfere with the transparency or reflectance of the substrate material. An additional object is to provide a transparent, non-fogging coating with improved permanence, of the anti-fogging protection, increased adhesion to the substrate, improved scratch and abrasion resistance, improved durability of the adhesion to the substrate and improved durability of the surface of the coating.

An additional object is to provide a transparent coating that will reduce the fogging characteristics for transparent or reflecting surfaces that may be easily applied to the surfaces to provide consistent results. A more specific object is to prepare a transparent, non-fogging coating for transparent or reflecting surfaces of glass, plastic or metal. An object is to provide non-fogging eye lenses and protective shields, windows and mirrors.

An additional object is to provide a transparent non-fogging coating for transparent substrates, particularly polycarbonate, with improved permanence and abrasion resistance.

SUMMARY OF THE INVENTION

The present invention is a substrate having on at least one surface thereof a non-fogging, abrasion resistant coating comprising a polyalkylene imine (e.g. polyethylene imine) cross-linked with a compound having at least two reactive groups capable of reacting with the amine hydrogen or yielding a covalent linkage to form a quaternary amine salt, to form a hard, durable, hydrophilic coating. For most substrates, the degree of cross-linking is preferably high, such that sufficient cross-linking functional compound is added capable of cross-linking the film to attain water insolubility. For certain substrates pendant reactive groups are optionally reacted to the amine hydrogens of the polyalkylene imine, the pendant groups being highly polar to promote adhesion to the substrate.

The coated surface of this invention is hard and resistant to abrasion. The coating absorbs up to 50% water on the weight of the coating without optical distortion or loss of adhesion to the substrate.

DESCRIPTION OF THE PREFERRED EMBODIMENTS

Figure 1:
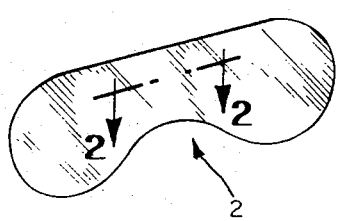
FIG. 1 is a view of a lens from a safety goggle.

The substrates most useful in this invention that are normally subject to fogging include organic polymers, particularly polycarbonate. This polymer is commonly used for shields and goggles for industrial application where fogging can constitute a safety hazard. The coated polycarbonate substrate of this invention not only offers anti-fogging characteristics but also improved abrasion resistance and mechanical properties. The non-fogging materials of this invention are normally transparent although they may be tinted such colors as amber for ski goggles.

The polyalkylene imine useful in this invention is a well recognized class of compounds available commercially with the following repeating unit structural formula I:

I. 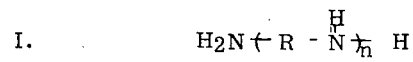

wherein R is substituted or unsubstituted alkylene group and n is an integer from about 2 to about 3,000.

When the backbone alkylene group is ethylene, the structural formula of the repeating unit takes the form of formula II:

II. 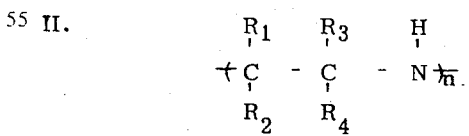

wherein $R_1$ through $R_4$ are chosen from the group consisting of hydrogen and lower alkyl and n is as hereinabove. It is preferred that $R_1$ through $R_4$ be chosen from the group consisting of hydrogen or methyl. Particularly preferred is polyethylene imine that is prepared by polymerizing ethylene imine in acid medium.

One skilled in the art will readily recognize that both formulas I and II are simplifications of the structural formula of polyalkylene imines. It is well known that this class of polymers generally forms a highly branched rather than a linear polymer structure. As a consequence, a typical structure of polyethylene imine contains a ratio of primary to secondary to tertiary nitrogens in the polymer of approximately 1:2:1. This branching does not interfere with the purposes of this invention and in fact this ratio is quite satisfactory. The formulas I and II may be considered as roughly average structures of the polymer particularly at higher molecular weights.

Although the molecular weight of the polyethylene imine polymer is not critical to the invention, the lower molecular weight range is preferred, primarily for ease of processing, handling and applying the solution to the substrate before cross-linking. The number average molecular weight ($\bar{M}n$) of commercially available polyethylene imine commonly ranges from about 60 (dimer) to about 120,000, and includes dipropylenetriamine, tetraethylenepentamine, etc. Preferred are polymers with average molecular weights in the range of 300 to 60,000 and most preferred is the range of 400 to 1,000.

With the higher molecular weight polyimine, the number of amine hydrogens per nitrogen atom approaches one. Theoretically, each nitrogen atom can also form a quaternary salt so that the maximum number of reactive sites per repeating unit approaches two as the molecular weight of the polyimine is increased. For the preferred lower molecular weight range the terminal groups significantly affect the number of reactive sites available for either cross-linking or attachment of pendant groups. For example, polyimine with an average molecular weight of 300 has about seven repeating units and about 9 amine hydrogens for an average of about 1.3 amine hydrogens per repeating unit. Including the quaternary salt reaction capability brings the average number of reactive sites per repeating unit to about 2.3.

The coating of this invention is cross-linked by reaction with the amine hydrogens and/or through bonding to the nitrogen to form a quaternary ionic salt. The poly-functional compounds capable of cross-linking the imine polymer contain at least two groups capable of reacting with either the amine hydrogen or the nitrogen atom. Thus the compound may contain (1) at least two functional groups that react only with amine by hydrogens, e.g. divinyl benzene, (2) at least two functional groups capable of reacting with either the amine hydrogen or the nitrogen to form a quaternary salt, e.g. methylene chloride, (3) at least one functional group capable of reacting with the amine hydrogen and at least one group capable of reacting with the nitrogen to form a quaternary salt, e.g. epichlorohydrin, or (4) at least one functional group capable of reacting with the amine hydrogen to form during the reaction a secondary functional group that in turn will react with the polyimine or with another group of like type, e.g. formaldehyde.

It is common to provide both cross-linking mechanisms in the same coating compositions, and it is also common to employ cross-linking compounds of more than one of the above groups. For example, the compounds of group (1) are particularly useful for chain extension reactions while the coating is in solution without gelling the product. Because of the branched nature of the polyalkylene imine polymers and the combination of cross-linking reactions taking place it is not known in which proportions the types of cross-linking reactions are taking place. The critical factor in the chemical compositions capable of cross-linking the polyalkylene imine polymers is that they contain at least two functional groups capable of either reacting with amine hydrogens or forming a covalent bond to a quaternary salt. References in the specification to "amine hydrogens" include both the primary and secondary nitrogen substituted hydrogen.

As a typical example, epichlorohydrin is preferred cross-linked compounds chosen from group (3) above. In this instance the cross-linking compound contains both expoxy and halogen functionality, each of which have the ability to react with the amine hydrogens on the polyalkylene imine polymers. If in the composition there are insufficient amine hydrogens to react with both the epoxy group and the halogen, the halogen can still react with the nitrogen group through the formation of a quaternary salt.

The class of functional groups capable of these reactions is well known to those skilled in the art and includes nonaromatic ethylenic unsaturation (activated unsaturation) like vinyl, vinylene, allyl, and butylene in such compounds as ethylene glycol, diacrylate and dimethacrylate, glycidyl methacrylate, divinyl benzene, diallyl phthalate, triallyl cyanurate, butylene glycol diacrylate, polypropylene fumarate, allyl chloride, glycidyl methacrylate, maleic anhydride, fumaric acid dichloromaleic anhydride, N,N'-methylene bisacrylamide, methacrylic acid, acrylic acid, 2-chloroethyl methacrylate and the like; epoxy and epihalo in such compounds as diepoxides, epihalohydrin, particularly epichlorohydrin, glycidyl methacrylate, glycidol, low molecular weight epoxy resins such as the reaction product of epichlorohydrin and bisphenol-A, and the like; halo such as alkylene halide and aicd halide like chloro, bromo and fluoro in such compounds as methylene chloride, methylene bromide, 1,2-dichloroethane, bis (2-chlorethyl) ether, epichlorohydrin, dichloromaleic anhydride, allyl chloride, 2-chloroethyl methacrylate, adipyl chloride; formyl and carbonyl in aldehydes and ketones in such compounds benzaldehyde, formaldehyde, 5,5-dimethyl-1,3-cyclohexadione, 2,5-hexanedione, dipentene dioxide and the like; carboxy and anhydride in such compounds as phthalic acids and anhydride, polyacrylic acid, glutaric acid, pyromellitic anhydride, methacrylic acid, acrylic acid, maleic anhydride, ethylene/maleic anhydride copolymers, and the like; isocyanato and isothiocyanato in such compounds as methylene bis(4-phenyl isocyanate and isothiocyanate); acidic hydroxy including phenolic hydroxy in such compounds as bisphenol-A and the like; and other functional groups that react directly or through intermediate reactions with either the amine hydrogens or the nitrogen atoms to form quaternary salts. The intermediate reactions possible are numerous in that many of the cross-linking compounds form additional functional group during the reaction with the polyimine. Some of these secondarily formed functional groups may in turn react with a polyimine or more likely react with the reaction product of another reaction with the polyimine. As an example, the reaction of glycidol with the polyimine is believed to first attach through an addition reaction of the epoxy with the amine hydrogen. A secondary reaction between two of these reaction products (each containing two hydroxyl groups) to yield a cross-link between the polyimine chains is possible, although this theory has not yet been clearly demonstrated. The term "polyfunctional" in describing the cross-linking compounds also includes those chemical compounds that through the reaction with the polyimine, form an additional functional group that reacts with the polyimine or the same functional group to form another site. An example of this type of polyfunctional compound is formaldehyde with which the reaction with the amine hydrogen forms a methylol group splitting out water to cross-link the imine polymer.

Preferred are those cross-linking compounds containing two functional groups of at least one chosen from the group consisting of epoxy, ethylenic unsaturation and halo. The compounds containing a combination of epoxy and halogen functionality, as represented by chemical structure depicted in formula III, are particularly effective and epichlorohydrin is particularly preferred.

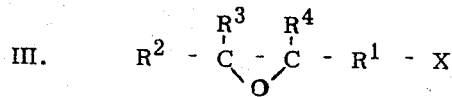

III.

where $R^1$ is $C_1$ to $C_8$ alkylene, $R^2$ to $R^4$ are each hydrogen or lower alkyl and X is halogen.

The amount of cross-linking compound reacted with the polyalkylene imine depends to a degree on the choice of cross-linking compound and the particular qualities desired in addition to the anti-fog characteristics obtained through the invention. The amount of cross-linking compound generally useful to provide a durable coating is that amount necessary to effectively provide a water insoluble film coating. A preferred effective amount of cross-linking compound is that amount necessary to yield a cured coating that gains less than 100% by weight of water on the weight of the film upon immersion to equilibrium. It is commonly desirable to react all of the amine hydrogens with either the cross-linking compound above or in combination with optional pendant mono-functional groups. In fact, it is not uncommon to provide sufficient amount of cross-linking and mono-functional compounds to react not only with all of the amine hydrogens in the polyimine but provide an excess which will copolymerize or homopolymerize with the cross-linking compounds. As an example, an effective coating is that in which approximately half of the amine hydrogens on the polyimine are first reacted with acrylonitrile followed by a cross-linking reaction in which there is present not only sufficient functional groups to react with all of the amine hydrogens but an excess to react with the nitrogen to form a quaternary salt. In general, the amount of cross-linking compound is present in amounts of 0.3 to 2.5 moles per equivalent weight of the alkylene imine repeating unit in the polyimine. Preferred is an amount of 0.4 to 2.0 moles cross-linking compound per imine repeating unit in the polymer. An amount 0.5 to 0.9 moler per imine repeating unit in the polymer is more preferred.

With some substrates, it is optional to react monofunctional compounds onto the polyalkylene imine polymers that do not effectively cross-link the polymer, or alternatively, to react additional polyfunctional compounds containing at least two functional groups for reacting with the imine polymer. The preferred mono-functional compounds and polyfunctional compounds react with polyimine to form groups that are generally pendant and may be particularly effective in promoting adhesion to the substrate. These adhesion promoters are preferably reacted onto the polyalkylene imine before any reaction with the compounds functioning solely as cross-linking compounds. Of particular preference are highly polar functional groups which promote adhesion to polymeric substrates such as polycarbonate resins, acrylic polymers, and the like. These highly polar functional groups may be attached in the form of mono-functional compounds or they may be present in polyfunctional compounds which may also function as cross-linking compounds. These highly polar groups may be attached by any of the functional groups effective in the cross-linking compounds with the criticality being that at least one of the functional groups be capable of reacting with the amine hydrogens of the polyimine. For some applications, it may be preferred that the highly polar pendant groups do not react with the amine hydrogen so as not to further cross-link the polymer, but in other cases, it may be preferred to increase the hardness and mar-resistance of the coating which can be achieved by attaching the highly polar functional group in the form of a polyfunctional compound which also acts as a cross-linking agent. The pendant polar groups include cyano, amido, acetyl, and aryl. Typical mono-functional compounds which may be reacted with the polyalkylene imine acrylonitrile, acrylamide, methacrylamide, N-alkyl acrylamides, methyl methacrylate, methyl acrylate and styrene compounds. Acrylonitrile is particularly preferred. Representative polyfunctional compounds which contain highly polar functional groups for promoting adhesion include glycidyl methacrylate and methylene-bisacrylamide.

The amount of pendant polar groups reacted onto the imine polymer should still have at least about 20 mole percent of the amine hydrogens still available for cross-linking for best results. Thus, the amount of polar groups added to the composition ranges from 0 to about 80 mole percent of the alkylene imine equivalent weight of repeating unit. An excess charge of the modifier is possible when the reactive group has a tendancy to homopolymerize thus providing an inefficient reaction to form the polar pendant groups. A particularly effective embodiment for use on polymeric substrates contains 10 to 75 mole percent pendant reactant per equivalent weight of imine repeating unit in the polymer, more preferably 0.20 to 0.65 mole percent.

Additional ingredients, added in minor quantities, may be included in the coating composition. These include dyes, leveling agents, and colorants which are either soluble in the polymer or are dispersed in such small particle size so as not to introduce significant haze in the coating. Other typical ingredients which may be included are ultra-violet stabilizers, heat stabilizers and the like.

The method of application of the coating to the substrate is not critical to the invention. It may be applied by dip coating, spray coating or roller coating.

Figure 7:
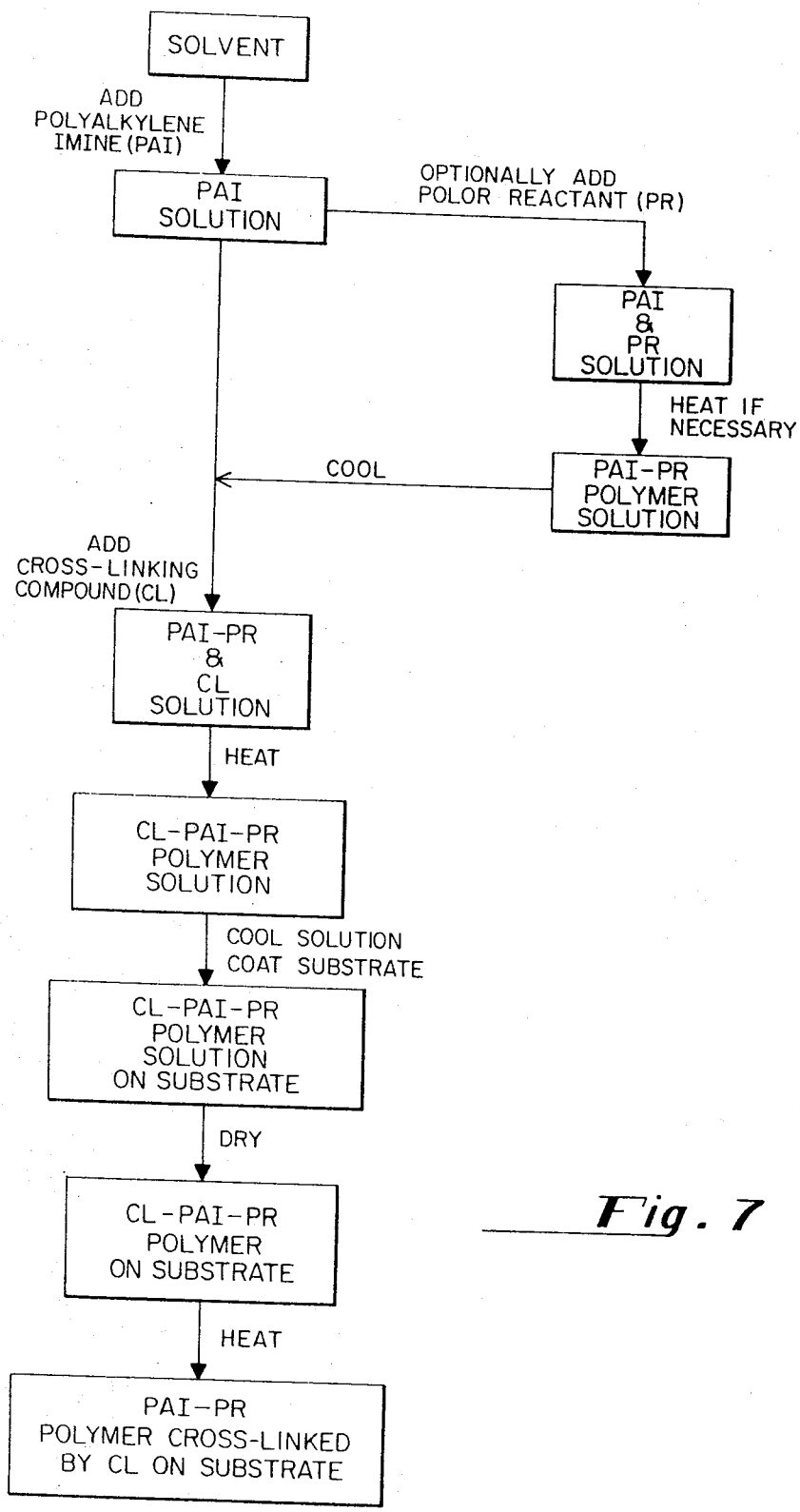
FIG. 7 is a flow diagram of a method of application of the anti-fog coating of this invention to the substrate.

The coating composition prior to application may be prepared by any known method but best results are obtained when the solution is prepared by the scheme depicted in FIG. 7. In this method of providing fogging protection the polyalkylene imine is placed into solution, such as in water, alcohol, or water-alcohol mixture (PAI solution). Water-lower alcohol mixtures are effective and mixtures containing 1 to 25% lower alcohols are preferred. 2-propanol is most effective in the aqueous solution. If the optional adhesion promoters (polar reactant-PR), either mono-functional or poly-functional, are to be reacted with the polyalkylene imine, it is preferred to add them to the solution before the addition of the cross-linking compounds and allow them to react with the amine hydrogens (to form PAI-PR polymer FIG. 7). Generally, as in the case of acrylonitrile, the reaction occurs spontaneously with the evolution of heat and it is only necessary to control the temperature to prevent exotherm runaway. The cross-linking chemical compounds (CL) are then added to the solution after which the substrate may be directly coated with the solution. For ease of handling, stability and best results it is preferred to allow or cause the cross-linking compound to react with the polyalkylene imine primarily as a chain extender (to form CL-PAI-PR polymer) such that it does not sufficiently cross-link the polymer to cause gel or precipitation of the polymer, preferably in the range of about 60° to 90°C for one-fourth to one-half hour. For these initial reactions the chain extension reaction is most easily carried out with low molecular weight polyalkylene imine and CL capable of reacting only with amine hydrogens. With the lower molecular polyimine the molecular weight of the extended polymer is more easily controlled to prevent gel. After the initial reaction with the cross-linking compound, the solution stabilizes and no further reaction takes place to gel or precipitate the polymer for a number of days. Refrigeration extends the life of the solution. After the substrate surface is coated with the solution, the coated surface (CL-PAI-PR polymer) may be immediately heated but it is preferred that most of the solvent be allowed to evaporate before heating. Temperatures to 130°C, generally 60 to 120°C, preferably 70°-90°C, are used to fully cross-link the imine polymer (PAI-PR polymer crosslinked by CL). The lower the temperature and the shorter the time the better the color of the cure coating. A nitrogen atmosphere for curing also reduces color formation. Generally 15 to 60 minutes provides sufficient cure at the above temperature ranges. The hardness of the coating is controlled to a degree by the amount of heating.

For many substrates only cleaning is necessary to provide good adhesion of the anti-fogging coating. However, when the substrate is particularly hydrophobic, it has been found effective to "etch" the surface before the coating is applied. In the case of glass the etching may be accomplished by dilute hydrofluoricc acid. With polymeric substrates, such as polycarbonate, an acid wash, which tends to oxidize and/or sulfonate the surface, is particularly effective. A solution of 1 to 3% by weight chromic acid in concentrated sulfuric acid gives excellent results. For example, the treatment of polycarbonate appears to make the surface hydrophilic after only a few minutes exposure.

The degree of fogging protection provided by the coating is approximately proportional to the thickness of the coating. Good results are obtained when the coating is 0.5 to 3 mils or thicker, but for some uses thickness may range well outside these limits.

The following examples are provided for illustration and are not intended to limit the scope of the invention. All parts and percentages are by weight unless otherwise noted. The following abbreviations are used in the examples:

| | |
|---|---|
| MM | methyl methacrylate |
| ECH | epichlorohydrin |
| PEI (numbers) | polyethylene imine (approximate number average molecular weight) |
| EO | ethylene oxide |
| AN | acrylonitrile |
| MBA | N,N'-methylene bisacrylamide |
| GM | glycidyl methacrylate |
| G | glycidol |
| S | styrene |
| IPA | isopropyl acrylamide |

The following test procedures are used in the examples:

FOGGING

Qualitative determinations of resistance to fogging are made by breathing on the surface for at least ten seconds and observing whether water condenses on the surface. A plus indicates that no significant condensation formed on the surface. A minus indicates that condensation forms readily.

Quantitative determination as indicated by Fogging Time in seconds is determined by exposure of the surface to air at 40°C saturated with water vapor. The sample is conditioned for 24 hours at 50 percent relative humidity, 250°C. The water saturated air is passed through a 1½ inch diameter tube at 1,100 cc. per minute. At the end of the glass tube are 1/32 inch high projections so that the sample surface can be held against the end of the tube and still provide sufficient air flow across the surface. The Fogging Time is the time from the placement of the sample against the projections until 50 percent of the exposed circular area displays fogging.

As a bench-mark, uncoated polycarbonate fogs almost instaneously in this test to yield a value of 1 or 2 seconds. A commercial anti-fogging coating offered under the "HYDRON" trademark by Woodstream-Hydron Corporation of Litiz, Pennsylvania, believed to be described in Example I to IV of U.S. Pat No. 3,488,315 to Shepherd et al, yields a fogging time of about 30 seconds.

HARDNESS

Hardness is a qualitative measure of the thumbnail hardness and general abrasion resistance of the coating. A plus indicates that the surface cannot be scratched with the finger nail and is generally abrasion resistant to handling and general use. A minus indicates that the surface can be scratched and is most applications would be abraded easily. A plus/minus indicates marginal results in some compositions. Pencil hardness commonly ranges from 2H to 4H.

ADHESION

Adhesion of the coating to the substrate is determined by scribing sets of horizontal and vertical lines one-eighth inch apart to yield a grid on the surface with a razor blade, applying a piece of pressure sensitive adhesive tape to the surface and quickly removing it. The quantitative measurement is the precent coating within the grid area lifted off.

DETERGENT STABILITY

The coated surface is immersed for sixteen hours in a 0.2% detergent solution at room temperature and wiped with a facial tissue. The surface quality is observed and in some instances adhesion tests are performed on the exposed samples.

EXAMPLE 1

A lens from a safety goggle of commercially available polycarbonate resin in the shape pictured in FIG. 1 is washed in hot detergent solution, rinsed and dried, hot washed with trichloro-trifluoroethane and dried.

A coating formulation is prepared by dissolving 100 parts (2.3 equivalent weights) polyethylene imine (Mn of 600; 500–2500 cps at 25°C; at least 99% $C_2H_5N$) in ethylene glycol monoethyl ether/mixture of 1-and 2-propanol (1/1) at about 15% concentration. A charge of 55 parts AN (1 mole) is added to the solution and allowed to react. An exotherm of approximately 10°C is observed. After the solution is allowed to cool to room temperature, 17 parts (0.1 mole) MBA ia added. The mixture may be heated to bring it into solution. After the solution is allowed to cool, 111 parts ECH (1.2 moles) are added. After the exotherm is disipated the solution is heated to 85°C. After cooling and filtering the solution is clear and stable for more than 24 hours at 25°C and for at least a week at 0°C.

Figure 2:
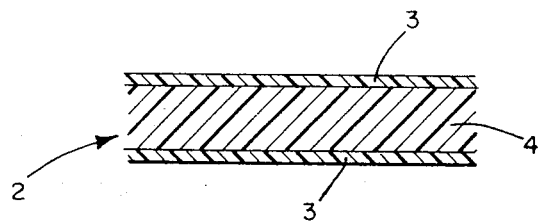
FIG. 2 is a sectional view along the line 2—2 of FIG. 1.

The lens 2 is dipped into the solution, allowed to dry and cured in an oven at 90°C for 15 to 60 minutes. The coating 3 is apparently fully cured at 30 minutes and significant yellowing does not occur until sixty minutes. The detergent stability of the coated goggle pictured in FIGS. 1 and 2 is good with Fog Times ranging from 50 to 65 seconds. After detergent exposure the Fog Time is 70 to 120 seconds with Adhesion rated adequate.

EXAMPLE 2

The procedure of Example 1 is repeated except that the composition of the coating is as follows:

| | |
|---|---|
| 100 parts (2.3 equivalent weights) | PEI (600) |
| 85 parts (1.6 moles) | AN |
| 20 parts (0.18 moles) | IPA |
| 15 parts (0.1 moles) | MBA |
| 100 parts (1.1 moles) | ECH |

After the lens is dipped the coating is cured at 110°C for 15 to 60 minutes. No appreciable improvement is observed by the longer cure times and the color intensity of the coating is increased upon exposure to the heat. The Hardness is good and Detergent Stability excellent. The Fog Time ranges from 35 to 40 seconds with excellent Adhesion indicated by 0% lift.

The above procedure is repeated except that the polycarbonate lens is "etched" by a procedure including the steps of a hot detergent wash, rinse, dry and a 30 second "etch" by 2% chromic acid in sulfuric acid at 25°C. The lens is then rinsed, dried and dip coated with the composition above using the same procedure. The Fog Time is 40 to 50 seconds with excellent Detergent Stability. The Adhesion remains excellent with 0% lift.

EXAMPLE 3

The procedure of Example 1 is repeated except that the PEI is reacted in a water solution of about 15 to 20% solids. The AN reaction yields a temperature rise of about 12°C. The solution is heated to 75°C after the ETCH is added and after filtering a surfactant, nonyl phenyl polyethylene glycol ether, is added.

The lens is "etched" as in Example 2 and dipped in the coating solution. The coated lens is dried and cured for 15 to 60 minutes at 90°C. The coatings are colorless and exhibit excellent detergent resistance. The Fog Time is 25 to 30 seconds and adhesion is 0% lift. When the etching of the lens is skipped, the surface was slightly mottled suggesting poor wetting by coating solution.

EXAMPLE 4

The procedure of Example 1 is repeated except that the composition of the coating comprises PEI of various molecular weights and a single cross-linker in various proportions. Typical results are provided in Table I:

Table I

Coatings of Example 4
PEI of Varying Molecular Weight with Crosslinkers in Varying Amounts

| PEI | | Crosslinker | | Detergent | Fogging |
|---|---|---|---|---|---|
| Molecular Wt. ($M_n$) | Amount (parts) | Type | Amount(parts) | Resistance | Time (seconds) |
| 50,000 to 100,000 | 100 | ECH | 100 | + | 12 |
|  | 200 |  | 100 | + | 12 |
| 40,000 to 60,000 | 100 | ECH | 100 | + | 120 |
|  | 100 |  | 200 | + | 11 – 21 |
| 40,000 to 60,000 (PEI/EO 10/1) | 100 | glycidol | 100 | + | 120 |
|  | 100 |  | 50 | + | 90 – 120 |
| 600 | 100 |  | 100 | + | 120 |
|  | 100 |  | 500 | + | 15 |
| 40,000 to 60,000 (PEI/EO 10/1) | 100 | GM | 150 | + | 120 |
|  | 100 |  | 100 | + | 19 – 23 |
|  | 100 |  | 40 | – | 34 |
| 600 | 100 | GM | 50 | – | 23 |
|  | 100 |  | 100 | + | 11 |
|  | 100 |  | 200 | + | 18 |

EXAMPLE 5

Procedure 1 is repeated except that the composition of the coating is varied as shown in Table II. Typical results for coating compositions using combinations of various cross-linking compounds with and without other reactive groups on the PEI are provided. The data in Table II further illustrates that the mole concentration of reactive groups of the cross-linker may be a good deal higher than the number of amine-hydrogen sites on the PEI and still yield a useful coating.

Table II

Coatings of Example 5
One Part PEI (600) Reacted with Various Combinations of Crosslinkers and Pendant Reactants

| Parts of Pendant Reactant Added | | | Parts of Cross-linker Added | | | Detergent Resistance | Fogging Time (seconds) |
|---|---|---|---|---|---|---|---|
| S | IPA | AN | ECH | GM | G | | |
|  |  |  | 1.0 | 0.2 | 0.8 | + | 120 |
|  |  |  | 1.0 | 0.2 | 0.6 | + | 120 |
|  |  |  | 0.8 | 0.2 | 0.8 | + | 104 |
|  |  |  | 0.8 | 0.2 | 0.6 | + | 120 |
|  |  |  | 0.6 | 0.2 | 0.6 | + | 72 |
|  |  |  | 0.4 | 0.4 | 0.4 | + | 83 |
|  |  |  |  | 0.4 | 0.1 | + | 120 |
| 0.6 |  |  | 0.8 |  | 0.4 | + | 120 |
| 0.6 |  |  | 1.0 |  |  | + | 120 |
| 0.2 |  |  | 1.0 |  |  | + | 104 |
| 0.1 |  |  | 1.0 |  | 0.6 | + | 120 |
|  |  |  | 1.0 |  | 0.6 | + | 120 |
|  |  | 0.4 | 1.0 |  |  | + | 120 | polycarbonate it is not permanent and only superficial anti-fogging characteristics are obtained. When compounds such as acrylonitrile are reacted onto the polymer, some improvement in the physical characteristics of the film is observed, however, the permanence of the coating is still poor. In general, the more hydrophobic the cross-liner is, the poorer the initial anti-fog characteristics. Thus, a compound such as divinyl benzene would generally be used in combination with other cross-linking compounds. Particularly effective are epichlorohydrin, glycidol, glycidyl methacrylate, bisphenol-A, fumaric acid, dichloromaleic anhydride, and benzaldehyde. Where both a plus and minus sign are shown under a physical property heading, it is an indication that marginal characteristics are obtained depending upon the substrate, concentration of the crosslinker, the molecular weight of the PEI and the conditions of the coating.

Table III

Coatings of Example 6
PEI (75,000) Reacted with Various Cross-Linkers

| Reactant | Color | Hardness | Detergent Stability | Fogging |
|---|---|---|---|---|
| none |  | − | − | − |
| AN |  | − | − | ± |
| IPA |  | − | − | ± |
| acrylamide |  | − | − | ± |
| EPCH |  | + | + | + |
| G |  | + | ± | + |
| GM |  | + | + | + |
| bisphenol-A | clear | ± | + | + |
| Epon 834 | sl. yellow | + | ± | + |
| fumaric acid | clear | + | + | + |
| dichloromaleic anhydride | clear | + | + | + |
| pyromellitic anhydride | clear | + | + | + |
| 2,5 — hexadione | sl. yellow | + | + | + |
| bis (dichloroethyl) ether | clear | − | + | + |
| dipentene dioxide | sl. yellow | + | + | + |
| adipyl chloride |  | + | − | + |
| itaconic acid | sl. haze | + | − | + |
| methylene bis(4-phenyl isocyanate) | sl. haze | + | + | + |
| methyl isobutyl ketone | sl. haze | − | ± | + |
| glutaric anhydride |  | − | + | + |
| 5,5-dimethyl(1,3-cyclohexadione) | clear | − | + | + |
| polyacrylic acid |  | + | − | + |
| formaldehyde |  | + | ± | ± |
| methylene-N,N-bisacrylamide |  | + | ± | + |
| benzaldehyde |  |  | + | + |
| divinyl benzene |  |  | ± | ± |
| acetone |  | + | + | + |
| polyethylene glycol methacrylate |  | + | − | + |
| diacetone acrylamide |  | − | + | + |
| ethylene glycol dimethacrylate |  | + | + | + |
| allyl chloride |  | + | − | + |

EXAMPLE 6

Solutions of various reactants are prepared in concentrations of 10 to 50 parts per 100 parts PEI (75,000) in 2-propanol. Polycarbonate lenses are dip-coated in the solution after which the coating is cured to provide a thickness of 0.5 to 3 mils. Qualitative observations are provided in Table III.

PEI (75,000) is a viscous liquid with a Brookfield viscosity of 15,000 to 25,000 cps. at 25°C. While this uncross-linked imine polymer can be solution-coated on

EXAMPLE 7

A solution of 100 parts PEI in 500 parts water is prepared. A charge of 55 parts acrylonitrile is added and allowed to react with the attendant temperature increase. While the solution is still warm, 16 parts methylene bisacrylamide is added after which the solution is cooled to 22°C. An amount of 110 parts epichlorohydrin is added incrementally over a period of one-half hour to control the temperature rise. After the entire amount is added the solution is heated to 80°C., then immediately cooled to 22°C and filtered. The viscosity of the coating solution may be increased by reacting at 80°C for 15 to 60 minutes. The solution is stable.

An abrasion resistant sheet of an interpolymer of allyl diglycol carbonate/vinyl acetate/methyl methacrylate is etched with chromic acid for 90 seconds at 22°C. The sheet is dipped in the coating solution prepared as above, dried and cured at 90°C in air for one hour. The Fog Time is 20 seconds and the Adhesion is excellent in that there is 0% lift in the tape tests both before and after immersion in detergent solution for 16 hours.

EXAMPLE 8

The procedure of Example 1 is repeated except that the 100 parts PEI(600) is placed in solution in a mixture of water/2-propanol (8/1) before reaction with the other components. A polycarbonate lens is etched with chromic acid, rinsed, dried, and dipped into the solution. After drying the coated lens is cured at 90°C for 15–60 minutes in nitrogen atmosphere. A hard, colorless coating is obtained with excellent detergent stability. At all cure times the Adhesion is excellent.

The average coating weight on the lens is 0.23 grams per lens such that a coating of approximately one mil is obtained. The equilibrium absorption of the coating at 50% relative humidity is about 15%. At 80% relative humidity the equilibrium water absorption is about 25 to 45%. At 100% relative humidity the water absorption of the coating is almost 50% without affecting the adhesion of the coating or its utility as on anti-fog coating.

After the coating is allowed to reach equilibrium at 50% relative humidity and 22°C, the Fog Time ranges from 50 to 70 seconds depending on the cure time. After the part is immersed in detergent solution at 22°C for 16 hours and dried for one-half hour at 22°C, the Fog Time is 95 to greater than 120 seconds. Even after the lens is brought to equilibrium at 80% relative humidity and 22°C, the Fogging Time is still in the range of 30 to 45 seconds. The coating is unaffected after 16 hours at −60°C and −78°C.

EXAMPLE 9

Figure 3:
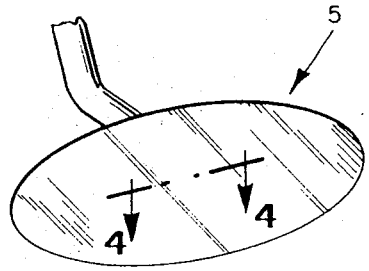
FIG. 3 is a view of a mirror.
Figure 4:
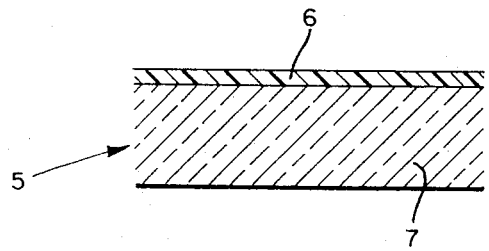
FIG. 4 is a sectional view along line 4—4 of FIG. 3.

Plate glass with mirror surface quality in the shape of FIG. 3 is spray coated with the composition of Example 1. After cure at 90°C., for 30 minutes a durable, fog-resistant mirror 5 obtained as pictured in FIGS. 3 and 4. The surface 6 is optically transparent and resistant to repeated washings without losing its anti-fogging property.

EXAMPLE 10

Figure 5:
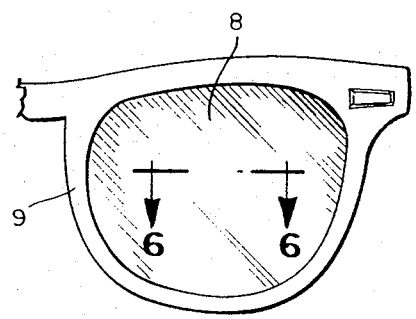
FIG. 5 is a view of a lens.
Figure 6:
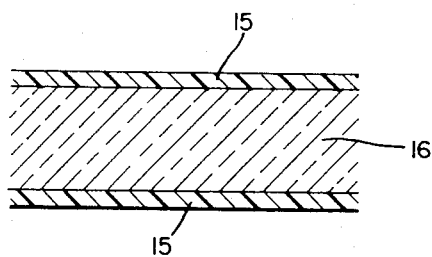
FIG. 6 is a blow-up of a sectional view along the line of 6—6.

A lens molded of polymethyl methacrylate of a molecular weight of about 100,000 in the shape of FIG. 5 is dip coated in the solution as prepared under Example 1. After the coating 15 is dried and cured for 30 minutes at 90°C, an abrasion resistant, anti-fogging lens as pictured in FIGS. 5 and 6 is obtained.

EXAMPLE 11

A 20% solution of poly(2-methyl aziridine) with a molecular weight of 600 to 1,000, is prepared in water/2-propanol (4:1 by volume). This solution is reacted with 45 parts of acrylonitrile. While the solution is still warm, 16 parts MNA are added after which the solution is cooled to 22°C. A charge of 110 parts ECH is added incrementally over a period of one-half hour to control the temperature rise. After this addition, the solution is held at 80°C. for 15 to 30 minutes to increase viscosity to the range suitable for dipping or spraying application. After curing a good anti-fog coating is obtained.

EXAMPLE 12

The procedure of Example 8 is repeated except that the following components are used in the coating:

3.6 parts triethylene tetramine (0.25 mole)
2.0 parts AN(0.04 mole)
0.6 part MBA(0.004 mole)
4.0 parts ECH(0.043 mole)

After cure of the coating on either polycarbonate or the interpolymer substrate used in Example 7 for 40 minutes at 90°C in air, the Fog Times are greater than 120 seconds and the surface is slightly soft.

EXAMPLE 13

A solution of an uncured resinous composition is prepared by dissolving 13.6 parts PEI(600) in 25 parts distilled water. A charge of 0.6 parts MBA is then dissolved in the solution followed by the gradual addition of 7.2 parts GM during which time the solution exotherms to about 60°C. While maintaining the solution at about 60°C, 4.0 parts ECH is added followed by the addition of 4.0 parts 2-propanol. The solution is heated to 68°C for 30 minutes and then immediately cooled to 25°C over a period of 30 minutes. The solution is stable at ambient temperatures for at least 6 months.

The solution is dip-coated on substrates including polycarbonate, glass and a sheet of an interpolymer of allyl diglycol carbonate/vinyl acetate/methyl methacrylate and then cured for 30 to 60 minutes at 100°C in a hot air oven. The coatings are all resistant to fogging and yield 0% lift in the adhesion test after detergent solution soaking.

EXAMPLES 14 through 18

Example 13 is repeated except that the proportions and components are varied according to Table IV. After cure for 30 minutes at 100°C, the coatings have excellent adhesion to glass and polycarbonate substrates and have Fogging Times greater than 120 minutes after over-night equilibration at 50% relative humidity. The coatings are hard to the fingernail and yield 0% lift after detergent soak.

Table IV

| Composition Proportions of Examples 2 through 6 | | | | | |
| --- | --- | --- | --- | --- | --- |
| | Example No. (parts) | | | | |
| Component | 14 | 15 | 16 | 17 | 18 |
| GM | 9.2 | 72.0 | 44.0 | 44.0 | 54.0 |
| MBA | 0.6 | 6.0 | 6.0 | 6.0 | 6.0 |
| ECH | 4.0 | 50.0 | 40.0 | 40.0 | 30.0 |
| PEI(600) | 3.6 | 36.0 | 36.0 | 36.0 | 36.0 |
| MM | — | — | 10.0 | — | — |
| AN | — | — | — | 5.0 | — |
| water | 25.0 | 250.0 | 250.0 | 250.0 | 250.0 |
| 2-propanol | 7.5 | 40.0 | 40.0 | 40.0 | 40.0 |

I claim:

1. A non-fogging material comprising a normally fogging substrate having on at least one surface thereof a non-fogging, water insoluble, hydrophilic polymeric coating comprising a polyalkylene imine having substantially all of its nitrogen atoms attached to a plurality of reactive compounds, at least one of said reactive compounds being a cross-linking compound having at least two functional groups capable of reacting with the polyalkylene imine selected from a nonaromatic ethylenic unsaturated group, an epoxy group, a halo group, a carboxylic acid or anhydride group, an aldehyde group, a ketonic group, an isocyanato or isothiocyanato group and a phenolic hydroxy group and another polyfunctional reactive compound containing a polar functional group to promote adhesion to the substrate selected from a cyano group, an amido group, an acetyl group and an aryl group and having at least two functional groups selected from a nonaromatic ethylenic unsaturated group, an epoxy group, a halo group, a carboxylic acid or anhydride group, an aldehyde group, a ketonic group, an isocyanato group or isothiocyanato group and a phenolic hydroxy group, said reactive compounds being reacted with the polyalkylene imine in an amount of at least one reactive equivalent per equivalent weight of the polyalkylene imine.

2. A material in accordance with claim 1 in which the functional groups capable of reacting with the polyalkylene imine contained by both the cross-linking compound and the polyfunctional reactive compound containing a polar functional group are selected from a nonaromatic ethylenic unsaturated group, an epoxy group and a halo group.

3. A material in accordance with claim 1 in which the cross-linking compound is epichlorohydrin, and the polyfunctional reactive compounds containing a polar functional group are glycidyl methacrylate and methylene bisacrylamide.

4. A material in accordance with claim 1 in which the polyalkylene imine is polyethylene imine.

5. A material in accordance with claim 3 in which the polyalkylene imine is polyethylene imine.

6. A material in accordance with claim 1 in which the cross-linking compound is present in an amount of about 0.3 to 2.5 moles per equivalent weight of the alkylene imine repeating unit and the polyfunctional reactive compound containing a polar functional group is present in an amount up to about 0.8 mole per equivalent weight of the alkylene imine repeating unit.

7. A material in accordance with claim 1 in which the substrate is polycarbonate.

8. A material in accordance with claim 3 in which the substrate is polycarbonate.

9. A method of applying a non-fogging polymeric coating to a substrate comprising:
1. preparing a solution of polyalkylene imine:
2. adding at least two polyfunctional reactive compounds containing a polar functional group selected from a cyano group, an amido group, an acetyl group and an aryl group to said polyalkylene imine solution and reacting said polyfunctional compounds having at least two functional groups selected from a nonaromatic ethylenic unsaturated group, an epoxy group, a halo group, a carboxylic acid or anhydride group, an aldehyde group, a ketonic group, an isocyanato or isothiocyanato group and a phenolic hydroxy group with the amine hydrogen of the polyalkylene imine, said reaction being exothermic;
3. cooling the reaction of step (2) if necessary to prevent an exothermic runaway reaction;
4. after thermally stabilizing the reaction of step (2), adding at least one cross-linking compound to the solution which has at least two functional groups selected from a nonaromatic ethylenic unsaturated group, an epoxy group, a halo group, a carboxylic acid or anhydride group, an aldehyde group, a ketonic group, an isocyanato or isothiocyanato group and a phenolic hydroxy group and is capable of reacting with and cross-linking the polyalkylene imine to a water insoluble coating upon complete reaction;
5. heating the solution containing the cross-linking compound to partially react it with the polyalkylene imine without cross-linking the imine polymer to a degree that the polymer will gel or come out of solution;
6. cooling the partially cross-linked polyalkylene imine solution to stabilize it;
7. applying the partially cross-linked polyalkylene imine solution to at least one surface of the substrate; and
8. heating the coated substrate to cause the cross-linking reaction to be completed whereby substantially all of the nitrogen atoms of the polyalkylene imine are attached to reactive compound so as to provide a non-fogging, abrasion resistant coated substrate.

10. The method of claim 9 in which the polyalkylene imine is polyethylene imine and a solvent for the partially cross-linked polyethylene imine is added to the solution in step (4) after the cross-linking compound is added to the solution.

11. The method of claim 9 in which the substrate is polycarbonate whose surface is treated with the solution of chromic acid and sulfuric acid prior to applying the coating thereto in step (7).

12. The method of claim 9 in which the polyfunctional reactive compounds containing a polar functional group are methylene bisacrylamide and glycidyl methacrylate.

13. The method of claim 9 in which the cross-linking compound is epichlorohydrin.

* * * * *